Patented Feb. 2, 1954

2,668,103

UNITED STATES PATENT OFFICE 2,668,103

DISULFIDES AS SYNERGISTS FOR 2,4-D

Lyle D. Goodhue, Bartlesville, Okla., assignor to Phillips Petroleum Company, a corporation of Delaware No Drawing. Application March 31, 1950, Serial No. 153,299

10 Claims. (Cl. 71—2.6)

This invention relates to the use of dialkyl disulfides as synergists for increasing the phytotoxicity of 2,4-dichlorophenoxyacetic acid and its derivatives.

I have now discovered that dialkyl disulfides are effective synergists for increasing the herbicidal action of 2,4-dichlorophenoxyacetic acid and its derivatives. The compounds of the present invention can be represented by the general formula

R—S—S—R′ wherein R and R′ are selected from straight and branched chain alkyl groups, each containing from eight to twelve carbon atoms, and can be different.

The term synergist as employed in this application refers to a material which will facilitate entrance of 2,4-dichlorophenoxyacetic acid (or other plant hormone) to the plant without itself rendering an effect which hinders or prevents absorption and/or translocation of said hormone.

The compounds of the present invention can be employed in admixture with 2,4-dichlorophenoxyacetic acid and its derivatives such as the esters and salts. Examples of esters include the methyl, butyl and isopropyl compounds. Typical salts include the sodium salt and the amine salts, such as the diethanol and triethanol amine salts. Following common usage, the term 2,4-D will be used hereinafter as a generic term covering the parent acid and its derivatives. 2,4-D has been widely used for selective weed killing purposes. These compounds are termed selective herbicides because in ordinary concentrations their phytotoxic action is directed substantially exclusively to plants of the broad leafed or dicotyledonous type, having little if any effect on narrow leafed or monocotyledonous plants. These compounds are absorbed by the leaves of dicotyledons and after being absorbed are translocated to other parts of the plant including the root system thus killing the plant from within. These compounds have found wide application as herbicides because in addition to killing that portion of the plant above ground, they also kill the root system thus preventing regrowth therefrom.

To be an effective synergist for 2,4-D a compound should have a low toxicity for plants since materials which provide a quick burning action prevent the translocation of 2,4-D. In addition, 2,4-D synergists should be of low toxicity to avoid harmful effects to desirable plants when compositions containing 2,4-D and synergists are applied to areas in which both desirable plants and those considered as "weeds" are growing. For example, it is important that 2,4-D synergists be substantially non-toxic to lawn grasses when 2,4-D compositions containing synergists are used for selectively removing weeds such as dandelions, etc. from lawns. Further, 2,4-D synergists should be readily absorbed by the plant and capable of rapid translocation therethrough.

A common method now in use for applying 2,4-D to plants comprises dissolving the compound in a suitable solvent such as diesel oil, emulsifying said solution in water and applying the emulsion as a spray. However, diesel oil and many other solvents of this type often provide a burning action which may be sufficient in many instances to prevent the effective translocation of the active ingredient, 2,4-D. In addition these solvents display varying degrees of toxicity to nearly all plants and some damage may come to desirable plants when herbicides containing such solvents are employed for selectively removing weeds from cultivated crops. Since my novel activators are excellent solvents for 2,4-D, they may be used to replace diesel oil when compounding emulsions for selective weed-killing purposes. Furthermore, since my novel activators not only increase the effectiveness of 2,4-D but also have a low toxicity to plants, numerous advantages are obtained by using these compounds in admixture with 2,4-D. For example the same effect may be obtained by using a smaller amount of 2,4-D in admixture with the present activators than when using 2,4-D in an inert solvent or carrier. In many instances the amount of 2,4-D may be reduced by as much as 90 per cent, that is, one-tenth the amount of 2,4-D in admixture with my novel activators usually provides substantially the same herbicidal effect as 2,4-D in an inert carrier or solvent.

In cases where it is not desirable to reduce the amount of 2,4-D when using my activators, the effectiveness of 2,4-D is increased and the plants are killed in a shorter period with less growth after application. When so operating plants will often be killed in 50 per cent of the time normally required when using 2,4-D without activators.

When operating in the manner described above with the compounds of the present invention, 2,4-dichlorophenoxyacetic acid or a derivative thereof is dissolved in a disulfide selected from the group disclosed hereinbefore in a ratio of from .01 to .5 pounds of 2,4-dichlorophenoxyacetic acid or derivative per pound of disulfide.

This solution is next emulsified in water and applied at a rate of 0.1 to 5 pounds of 2,4-dichlorophenoxyacetic acid or derivative per acre. The amount of water employed will usually be in the range from 5 to 50 gallons per acre.

It is an advantage of the compositions of the present invention that they are particularly effective against woody plants such as Jack oak and the like.

*Example I*

The following is a comparison of the action of 2,4-D in Soltrol* 140 (a non-toxic solvent) and di-tertiary-octyl disulfide at four concentrations. One cc. of each solution was emulsified in 20 cc. of water with 5 drops of Triton X 100 (alkylated aryl polyether alcohol). This emulsion was then sprayed on vigorous string bean plants. The effect of di-tert-octyl disulfide in reducing the terminal weight growth is clearly evident from the following table.

| Test No. | Solvent | Concentration of 2,4-D, Percent | Wt. of Terminal Growth at End of 14 Days (Gms). |
|---|---|---|---|
| 1 | Di-tert-octyl disulfide | 0.1 | 2.1 |
| 2 | do | 0.01 | 8.5 |
| 3 | do | 0.001 | 11.1 |
| 4 | do | 0.0001 | 15.0 |
| 5 | Soltrol 140* | 0.1 | 6.0 |
| 6 | do | 0.01 | 21.2 |
| 7 | do | 0.001 | 25.5 |
| 8 | do | 0.0001 | 18.4 |

*Soltrol 140 is an isoparaffinic hydrocarbon fraction boiling between 360 and 410° F. at 760 mm. and having little if any phytotoxic effect.

The epinasty (curling and bending down) was much greater in tests 2, 3 and 4 where di-tert-octyl disulfide was used with 2,4-D than in tests 6, 7 and 8 where Soltrol 140 was used as the solvent. The epinasty produced by 2,4-D dissolved in the disulfide was equivalent to the epinasty produced by approximately ten times the amount of 2,4-D in the inert solvent Soltrol 140, in the tests referred to above.

*Example II*

The tests of Example I were repeated using di-tert-dodecyl disulfide instead of di-tert-octyl disulfide. The synergistic effect of this disulfide was nearly the same as noted in Example I.

The epinasty was substantially equivalent to that of a solution of di-tert-octyl disulfide having ⅕ the concentration of 2,4-D.

*Example III*

The effect of 2,4-dichlorophenoxyacetic acid dissolved in diesel fuel, a solvent commonly used in the field, and in di-tert-octyl disulfide on young cotton plants was determined. Concentrations of 2,4-dichlorophenoxyacetic acid in each solvent of 0.1 and 0.01 weight per cent were employed. At each of the concentrations employed, the plants sprayed with the disulfide containing emulsion were more seriously affected than those sprayed with the diesel fuel containing emulsions. The action of 0.01 concentration in disulfide was equivalent to the action of the 0.1 concentration in diesel fuel.

*Example IV*

A five per cent solution of di-tert-octyl-disulfide in Soltrol 140 (an isoparaffinic hydrocarbon boiling between 360 and 410° F. at 760 mm.) was sprayed on mature cotton plants, at a rate of 80 pounds of disulfide per acre in a field test. The plants were still alive fourteen days after application of the disulfide solution.

Reasonable variation and modification are possible within the scope of the foregoing disclosure and the appended claims to the invention the essence of which is that dialkyl disulfides have been found to synergize 2,4-dichlorophenoxyacetic acid and its derivatives, which are set forth in U. S. Patent 2,390,941, issued December 11, 1945.

I claim:

1. A herbicidal composition of matter comprising 2,4-dichlorophenoxy acetic acid as an effective ingredient thereof and di-tert-octyl disulfide as a synergist therefor.

2. An improved method for killing weeds which comprises applying to said weeds a composition according to claim 1.

3. A herbicidal composition of matter comprising 2,4-dichlorophenoxyacetic acid as an effective ingredient thereof and di-tert-dodecyl disulfide as a synergist therefor.

4. An improved method for killing weeds which comprises applying to said weeds a composition according to claim 3.

5. A herbicidal composition of matter comprising a compound selected from the group consisting of 2,4-dichlorophenoxyacetic acid and its salts and esters and a compound selected from the group of compounds which can be represented by the general formula

R—S—S—R' wherein R and R' are selected from straight and branched-chain alkyl groups, each containing from eight to twelve carbon atoms, and can be different.

6. An improved method for killing weeds which comprises applying to said weeds a composition according to claim 5.

7. A composition according to claim 5 wherein .01 to 0.5 pounds of a compound selected from the group consisting of 2,4-dichlorophenoxyacetic acid and its salts and esters is dissolved in about one pound of said selected compound.

8. An improved method for killing weeds which comprises applying in a proper manner to said weeds a composition according to claim 7.

9. A herbicidal composition of matter comprising a compound selected from the group consisting of 2,4-dichlorophenoxyacetic acid and its salts and esters and di-tert-octyl disulfide.

10. A herbicidal composition of matter comprising a compound selected from the group consisting of 2,4-dichlorophenoxyacetic acid and its salts and esters and di-tert-dodecyl disulfide.

LYLE D. GOODHUE.

References Cited in the file of this patent

UNITED STATES PATENTS

| Number | Name | Date |
|---|---|---|
| 1,986,218 | Remy | Jan. 1, 1935 |
| 2,043,941 | Williams | June 9, 1936 |
| 2,390,941 | Jones | Dec. 11, 1945 |

OTHER REFERENCES

"Science", Oct. 16, 1936, page 356.